(12) United States Patent
Pan

(10) Patent No.: US 11,283,689 B2
(45) Date of Patent: Mar. 22, 2022

(54) METHOD FOR MANAGING MULTIPLE SERVERS AND DEVICE EMPLOYING METHOD

(71) Applicant: HONGFUJIN PRECISION ELECTRONICS (TIANJIN) CO., LTD., Tianjin (CN)

(72) Inventor: Sheng-Chung Pan, New Taipei (TW)

(73) Assignee: HONGFUJIN PRECISION ELECTRONICS (TIANJIN) CO., LTD., Tianjin (CN)

(*) Notice: Subject to any disclaimer, the term of this patent is extended or adjusted under 35 U.S.C. 154(b) by 205 days.

(21) Appl. No.: 16/444,191

(22) Filed: Jun. 18, 2019

(65) Prior Publication Data

US 2020/0389366 A1    Dec. 10, 2020

(30) Foreign Application Priority Data

Jun. 4, 2019    (CN) .......................... 201910483261.6

(51) Int. Cl.
| | | |
|---|---|---|
| *H04L 12/24* | (2006.01) | |
| *H04L 12/931* | (2013.01) | |
| *H04L 29/12* | (2006.01) | |
| *H04L 41/22* | (2022.01) | |
| *H04L 49/40* | (2022.01) | |
| *H04L 101/69* | (2022.01) | |
| *H04L 101/622* | (2022.01) | |

(52) U.S. Cl.
CPC .............. *H04L 41/22* (2013.01); *H04L 49/40* (2013.01); *H04L 61/609* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 9,806,958 | B1* | 10/2017 | Moorthy | ................. H04L 41/22 |
| 10,257,268 | B2* | 4/2019 | Cencini | ............... H04L 67/1042 |
| 2008/0062891 | A1* | 3/2008 | Van der Merwe | ...... H04L 45/04 |
| | | | | 370/254 |
| 2011/0252248 | A1* | 10/2011 | Cameron | ............... G06Q 10/04 |
| | | | | 713/300 |

(Continued)

FOREIGN PATENT DOCUMENTS

| | | |
|---|---|---|
| TW | 200422957 A | 11/2004 |
| TW | 200713948 A | 4/2007 |
| TW | 201514719 A | 4/2015 |

*Primary Examiner* — Davoud A Zand
(74) *Attorney, Agent, or Firm* — ScienBiziP, P.C.

(57) ABSTRACT

A method for managing of managing a server center comprising: obtaining, from the switch, a MAC address and location information of each of the servers connected to the switch, and generating a first list; obtaining a MAC addresses and an IP address of each of the servers from the server center by using an IPMI command, and generating a second list; generating a third list based on the first list and the second list; obtaining a MAC address or an IP address of a server to be queried; and comparing the MAC address or the IP address of the server to be queried and the third list, and obtaining the location information of the server to be queried. A server center managing device and a non-transitory storage medium are also provided.

12 Claims, 5 Drawing Sheets

(56) References Cited

U.S. PATENT DOCUMENTS

| | | | |
|---|---|---|---|
| 2014/0129685 A1* | 5/2014 | Bhatt | H04L 12/4641 |
| | | | 709/220 |
| 2017/0054603 A1* | 2/2017 | Kulkarni | H04L 41/0893 |
| 2017/0085637 A1* | 3/2017 | Cencini | G06F 1/189 |
| 2017/0131753 A1* | 5/2017 | Ahmed | G06F 9/5027 |
| 2017/0132168 A1* | 5/2017 | Ahmed | G06F 13/4068 |
| 2017/0134349 A1* | 5/2017 | Ahmed | H04L 63/0823 |
| 2017/0142769 A1* | 5/2017 | Gilbert | H04L 41/0663 |
| 2017/0160776 A1* | 6/2017 | Ahmed | G06F 1/3212 |
| 2017/0180206 A1* | 6/2017 | Ahmed | G06F 15/80 |
| 2019/0090154 A1* | 3/2019 | Olderdissen | H04L 61/2015 |
| 2019/0260829 A1* | 8/2019 | Cencini | G06F 1/206 |
| 2020/0004720 A1* | 1/2020 | Pan | H04L 61/6022 |

* cited by examiner

METHOD FOR MANAGING MULTIPLE SERVERS AND DEVICE EMPLOYING METHOD

FIELD

The subject matter herein generally relates to server management.

BACKGROUND

Server centers are composed of a plurality of server cabinets deploying a plurality of servers. Finding a particular server can be inconvenient for an administrator. A rack manager module can be available from a vendor to network the servers in each server cabinet, but a user is required to purchase the rack manager module to read the server location information in the server cabinets.

BRIEF DESCRIPTION OF THE DRAWINGS

Implementations of the present disclosure will now be described, by way of embodiment, with reference to the attached figures.

DETAILED DESCRIPTION

Figure 1:
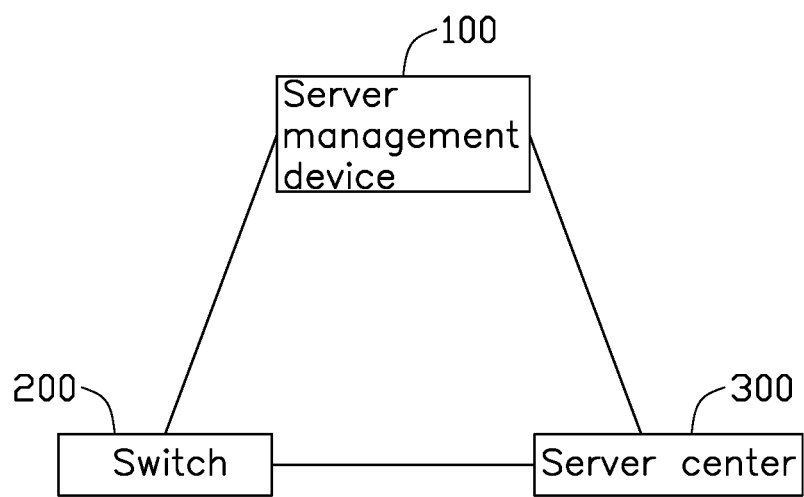
FIG. 1 is a diagram showing an embodiment of an environment of a device for managing servers, the device being in communication with a switch and a server center.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an embodiment of a server management device 100 for managing a server center 300. The server center 300 includes a plurality of servers. The plurality of servers are connected to at least one switch 200. The server management device 100 can communicate with the switch 200 and the server center 300.

In one embodiment, the plurality of servers can be connected to one switch 200. In other embodiments, the plurality of servers can be connected to different switches 200.

In one embodiment, the server center 300 can include a plurality of server cabinets, each server cabinet deploying an internal switch and a plurality of servers. The servers are electrically connected to the internal switch, and the internal switch is electrically connected to the switch 200.

In one embodiment, a plurality of internal switches can be electrically connected to one switch 200. In other embodiments, the plurality of internal switches can be electrically connected to a plurality of switches 200.

The internal switch stores MAC addresses of all servers in the server cabinet, the internal switch to which the server is connected and the ports of the internal switch to which the server is connected.

Figure 2:
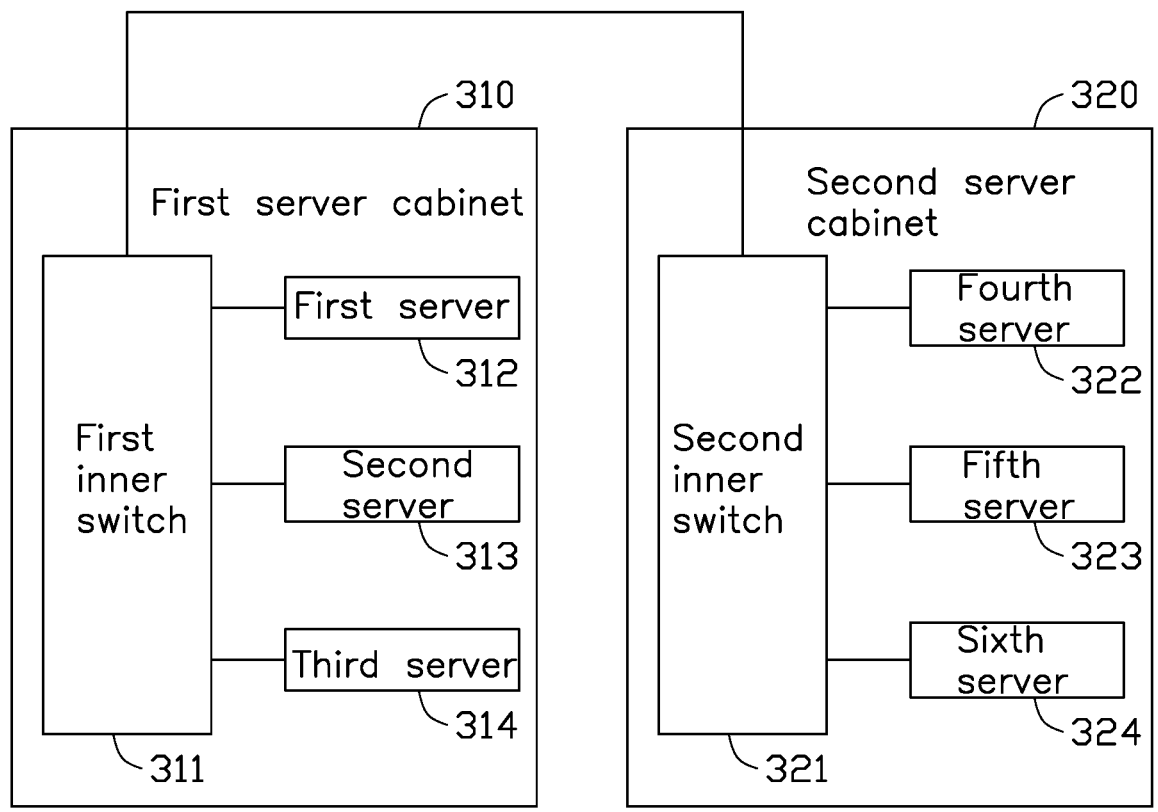
FIG. 2 is a block diagram of an embodiment of server cabinets.

FIG. 2 illustrates an embodiment of server cabinets. The server center 300 can include a first server cabinet 310 and a second server cabinet 320. The first server cabinet 310 deploys a first internal switch 311, a first server 312, a second server 313, and a third server 314. The second server cabinet 320 deploys a second internal switch 321, a fourth server 322, a fifth server 323, and a sixth server 324.

For example, the location information of the first server 312 stored in the first internal switch 311 includes the MAC address of the first server 312, the first internal switch 311 to which the first server 312 is connected, and the port of the first internal switch 311 to which the first server 312 is connected.

The location information of the second server 313 stored in the first internal switch 311 includes the MAC address of the second server 313, the first internal switch 311 to which the second server 313 is connected, and the port of the first internal switch 311 to which the second server 313 is connected.

The location information of each of the other servers is stored in the other internal switches in similar fashion to that of the first switch 311, the stored location information always including a MAC address, a port corresponding to the connected internal switch, and the connected internal switch. As the server cabinet is in one-to-one correspondence with each internal switch, the server cabinet where the server is located can be obtained.

Figure 3:
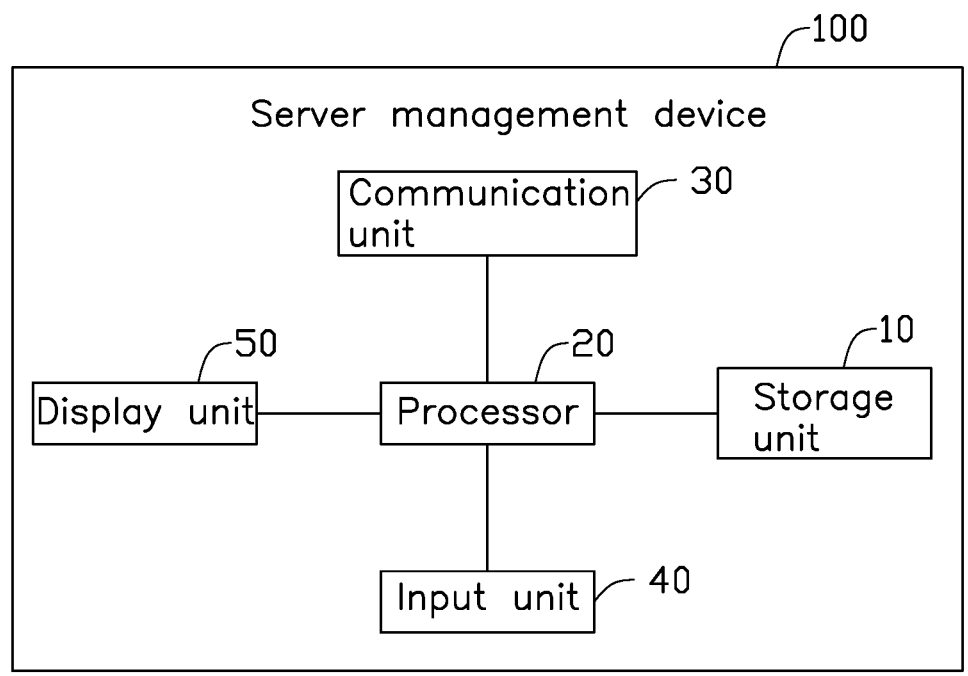
FIG. 3 is a block diagram of an embodiment of the managing device.

FIG. 3 illustrates that the server management device 100 includes a storage unit 10, a processor 20, a communication unit 30, an input unit 40, and a display unit 50. The storage unit 10, the communication unit 30, the input unit 40, and the display unit 50 are electrically connected to the processor 20. In at least one embodiment, the server management device 100 can be a computer, a server, or a controller.

The server management device 100 can be in communication with the switch 200 and the server center 300 by using a network, and the network may be a wired or wireless network.

The storage unit 10 stores a plurality of instructions executable by the processor 20, such as the server management system 2.

The storage unit 10 can be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

The processor 20 may include one or more central processors (CPU), a microprocessor, a digital processing chip, a graphics processor, or a combination of various control chips.

The processor 20 is a control unit of the server management device 100. The processor 20 can be configured to run or execute programs or modules, and can read data, stored in the storage device 10, to execute the server management system 2.

The communication unit 30 is configured to establish a communication connection with the switch 200 and the server center 300. The communication unit 30 can be a wired communication unit or a wireless communication unit. In this embodiment, the communication unit 30 establishes a communication connection with the switch 200 and the server center 300 through a wired network. It can be understood that the communication unit 30 can also establish a communication connection with the switch 200 and the server center 300 through the wireless network. The wireless network may be, but is not limited to, WIFI, Bluetooth, cellular mobile network, satellite network, and the like.

The input unit 40 allows the input of data and control commands by the user. The input unit 40 may be, for example, one or more of a mouse, a keyboard, a touch screen, a voice input device, and the like.

The display unit 50 displays a relationship between the server management device 100, the switch 200, and the server center 300, and can further display server information. The server information includes a server IP address, a MAC address, and location information, and the display unit 50 can be a display, a touch screen, or the like.

The switch 200 obtains MAC addresses and location information of all servers connected to the switch 200, where the location information includes a switch 200 connected to the server and a port of the connected switch 200.

The location information also includes a server cabinet where the server is located, the internal switch to which the server is connected, and a port of the internal switch to which the server is connected.

Figure 4:
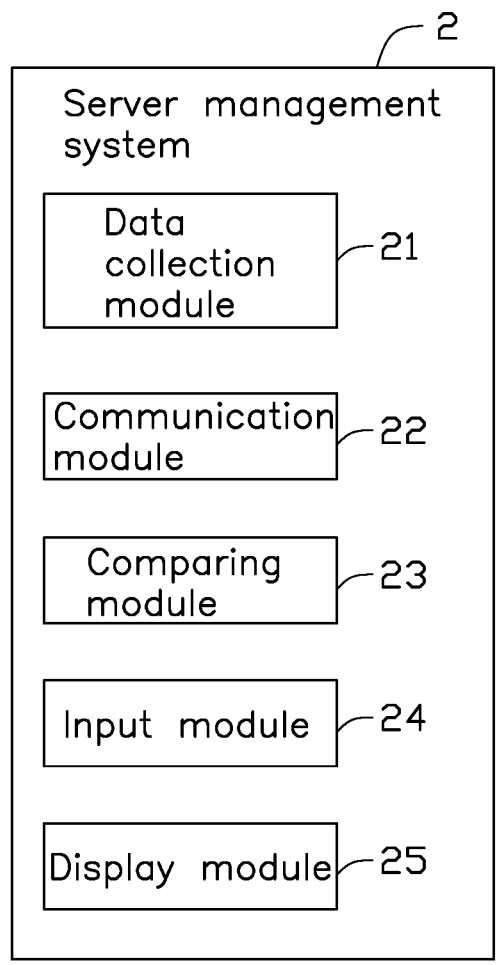
FIG. 4 is a block diagram of an embodiment of a server management system.

FIG. 4 shows the server management system 2. The server management system 1 may include a plurality of modules, which are a collection of software instructions stored in the storage unit 10 and executable by the processor 20. In the embodiment as disclosed, the server management system 2 can include a data collection module 21, a communication module 22, a comparing module 23, an input module 24, and a display module 25.

The data collection module 21 collects MAC addresses and location information of all servers connected to the switch 200, and generates a first list. The first list includes MAC addresses and location information of all servers connected to the switch 200.

The communication module 22 can send a remote IPMI command to a server to obtain a MAC address and an IP address of each server of the server center 300, and can generate a second list. The second list includes the MAC addresses and IP addresses of all the servers of the server center 300.

In other embodiments, a custom IPMI instruction can be set to quickly obtain system information of the servers.

The comparing module 23 compares the first list and the second list, and can generate a third list accordingly. The third list includes the MAC addresses, IP addresses, and location information of all the servers.

The input module 24 can invoke the input unit 40 to obtain information of a server needing to be queried, for example, a MAC address or an IP address of the server to be queried.

The comparing module 23 can compare the information of the server to be queried with the information in the third list, and obtain location information of the server to be queried.

The display module 25 can create a graphical user interface for displaying the location information of the server.

Figure 5:
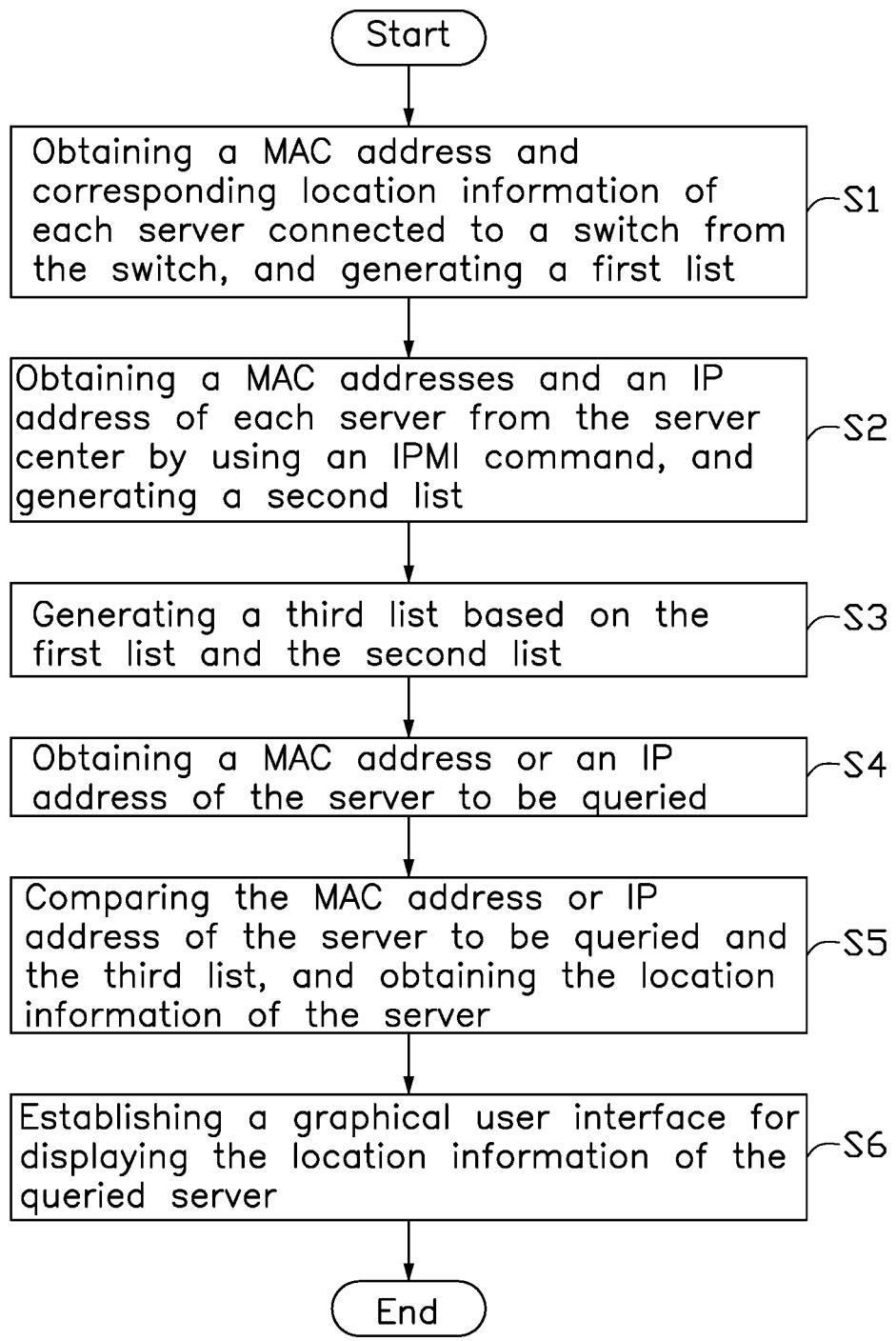
FIG. 5 is a flowchart of an embodiment of a method of managing servers.

FIG. 5 illustrates a flowchart of an exemplary method for managing a server center. The example method is provided by way of example, as there are a variety of ways to carry out the method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S1.

At block S1, a MAC address and corresponding location information of each server connected to a switch is obtained from the switch, and a first list is generated.

The sever management device 100 can be connected to the switch 200 through SSH Secure Shell Protocol. The data collection module 21 obtains from the switch 200, the MAC address and corresponding location information of each server connected to the switch 200, and generates the first list. The first list includes the MAC address and corresponding location information of each server, and the location information includes the switch 200 which the server is connected to, and the port of the switch 200.

In one embodiment, the server center 300 deploys a plurality of server cabinets, and each server cabinet deploys an internal switch and a plurality of servers. The plurality of servers are electrically connected to the inner switch, and the inner switch is electrically connected to the switch 200. The location information further includes the server cabinet of the server, the internal switch which the server is connected to, and the port of the internal switch which the server is connected to.

At block S2, a MAC addresses and an IP address of each server from the server center is obtained by using an IPMI command, and a second list is generated.

The server management device 100 is coupled to each server, and the communication module 22 sends a remote IPMI (Intelligent Platform Management Interface) command to each server to obtain the MAC address and the IP address, and generate the second list. The second list includes the MAC address and the IP address of each server.

The core of IPMI is a baseboard management controller (BMC), and the BMC is usually a separate board installed on the server motherboard. All IPMI functions at work are completed by sending command to the BMC. The command uses the instructions specified in the IPMI specification. The BMC receives and records event messages in the system event log, and maintains sensor data records describing the sensor conditions in the system.

At block S3, a third list based on the first list and the second list is generated.

The comparing module 23 compares the first list and the second list, and generates the third list based on the first list and the second list. The first list, the second list, and the third list are all text documents or excel tables, so that the computer can read or call.

At block S4, a MAC address or an IP address of the server to be queried is obtained.

The input module 24 is configured to invoke the input unit 40 to obtain the MAC address or an IP address of the server to be queried.

At block S5, the MAC address or IP address of the server to be queried is compared to the third list, and the location information of the server is obtained.

The MAC address or the IP address is a unique identifier of the server, and can be used as an index of the location information of the search server. The comparing module 23 queries the third list by using the MAC address or the IP address, and obtains location information corresponding to the MAC address or the IP address. Therefore, the location information of the server to be queried is obtained.

At block S6, a graphical user interface for displaying the location information of the queried server is created and displayed.

The display module 25 creates the graphical user interface for displaying the location information of the queried server, and controls the display unit to display the graphical user interface. The graphical user interface includes a distribution diagram of all the switches 200 and all the servers of the server center 300. The location information of the server is displayed through a tree diagram or a context diagram.

The processes at block S1 to S3 are performed in accordance with a predetermined time period. For example, the processes at bloc S1 to S3 are performed every sixty seconds.

In other embodiments, the process at block S6 can be omitted.

The present invention provides a versatile server management method, which can quickly and accurately obtain the location information of the servers in the server center 300. The server management method is easy to implement and highly practical. The present invention also provides a server management apparatus 100, which is low in cost and high in utility.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method of managing a server center deploying a plurality of servers, the plurality of servers being coupled to at least one switch, the method comprising:
   obtaining, from the switch, a MAC address and location information of each of the servers connected to the switch, and generating a first list;
   obtaining a MAC addresses and an IP address of each of the servers from the server center by using an IPMI command, and generating a second list; generating a third list based on the first list and the second list;
   obtaining a MAC address or an IP address of a server to be queried;
   comparing the MAC address or the IP address of the server to be queried and the third list, and obtaining the location information of the server to be queried; and
   creating a graphical user interface for displaying the location information of the server to be queried, wherein the graphical user interface comprises a distribution diagram of the at least one switch and the servers of the server center, and the location information of each of the servers is displayed through a tree diagram or a context diagram.

2. The method of claim 1, wherein the location information comprises a switch to which the server is connected, and a port of the switch to which the server is connected.

3. The method of claim 2, wherein the server center comprises a plurality of server cabinets, each of the server cabinets deploys an internal switch and a plurality of servers electrically connected to the internal switch, and the internal switch is electrically connected to the switch; and
   wherein the location information further comprises a server cabinet where the server is located, an internal switch to which the server is connected, and a port of the internal switch to which the server is connected.

4. The method of claim 1, wherein the processes of generating the first list, generating the second list, and the generating the third list are performed in accordance with a predetermined time period.

5. A server center managing device, configured to manage a server center deploying a plurality of servers, the plurality of servers being coupled to at least one switch, the server center managing device being in communication with the server center and the switch, the server center managing device comprising:
   a display unit;
   an input unit;
   at least one processer;
   a storage device storing one or more programs, when executed by the processor, the one or more programs cause the processor to:
      obtain, from the switch, a MAC address and location information of each of the servers connected to the switch, and generating a first list;
      obtain a MAC addresses and an IP address of each of the servers from the server center by using an IPMI command, and generating a second list;
      generate a third list based on the first list and the second list;
      obtain a MAC address or an IP address of the server to be queried;
      compare the MAC address or the IP address of the server to be queried and the third list, and obtain the location information of the server to be queried; and
      create a graphical user interface for displaying the location information of the server to be queried, wherein the graphical user interface comprises a distribution diagram of the at least one switch and the servers of the server center, and the location information of each of the servers is displayed through a tree diagram or a context diagram.

6. The server center managing device of claim 5, wherein the location information comprises a switch to which the server is connected, and a port of the switch to which the server is connected.

7. The server center managing device of claim 6, wherein the server center comprises a plurality of server cabinets, each of the server cabinets deploys an internal switch and a plurality of servers electrically connected to the internal switch, and the internal switch is electrically connected to the switch; and
   wherein the location information further comprises a server cabinet where the server is located, an internal switch to which the server is connected, and a port of the internal switch to which the server is connected.

8. The server center managing device of claim 5, wherein the processes of generating the first list, generating the second list, and the generating the third list are performed in accordance with a predetermined time period.

9. A non-transitory storage medium having stored thereon instructions that, when executed by at least one processor of a server center management device, causes the at least one processor to execute instructions of a method for managing a server center deploying a plurality of servers, the plurality of servers being coupled to at least one switch, the method comprising:
obtaining, from the switch, a MAC address and location information of each of the servers connected to the switch, and generating a first list;
obtaining a MAC addresses and an IP address of each of the servers from the server center by using an IPMI command, and generating a second list;
generating a third list based on the first list and the second list;
obtaining a MAC address or an IP address of the server to be queried;
comparing the MAC address or the IP address of the server to be queried and the third list, and obtaining the location information of the server to be queried; and
creating a graphical user interface for displaying the location information of the server to be queried, wherein the graphical user interface comprises a distribution diagram of the at least one switch and the servers of the server center, and the location information of each of the servers is displayed through a tree diagram or a context diagram.

10. The non-transitory storage medium of claim 9, wherein the location information comprises a switch to which the server is connected, and a port of the switch to which the server is connected.

11. The non-transitory storage medium of claim 10, wherein the server center comprises a plurality of server cabinets, each of the server cabinets deploys an internal switch and a plurality of servers electrically connected to the internal switch, and the internal switch is electrically connected to the switch; and
wherein the location information further comprises a server cabinet where the server is located, an internal switch to which the server is connected, and a port of the internal switch to which the server is connected.

12. The non-transitory storage medium of claim 11, wherein the processes of generating the first list, generating the second list, and the generating the third list are performed in accordance with a predetermined time period.

* * * * *